Jan. 8, 1952  J. ZAKHEIM  2,581,743
AUTOMATIC SYSTEM FOR AIRCRAFT
Filed July 9, 1948  2 SHEETS—SHEET 1
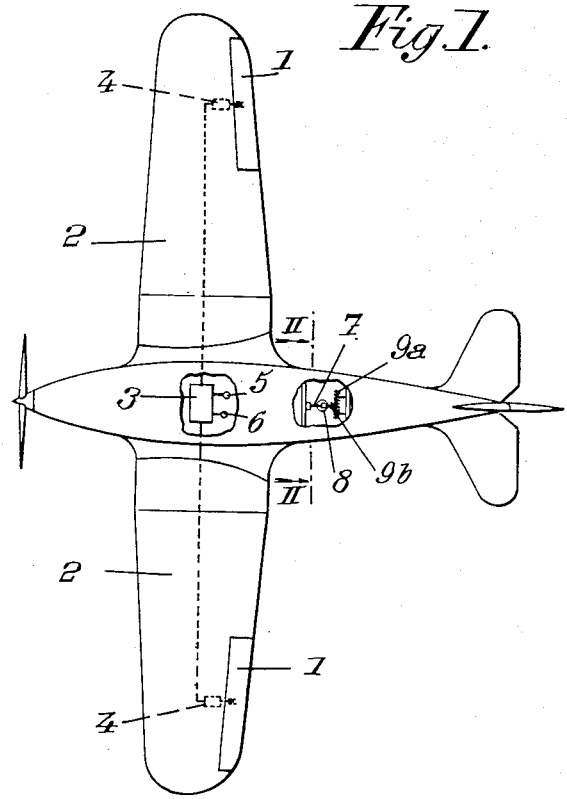
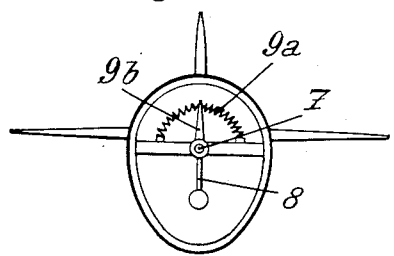
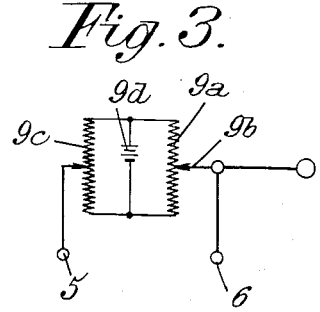
INVENTOR
JACQUES ZAKHEIM
BY
ATTORNEY

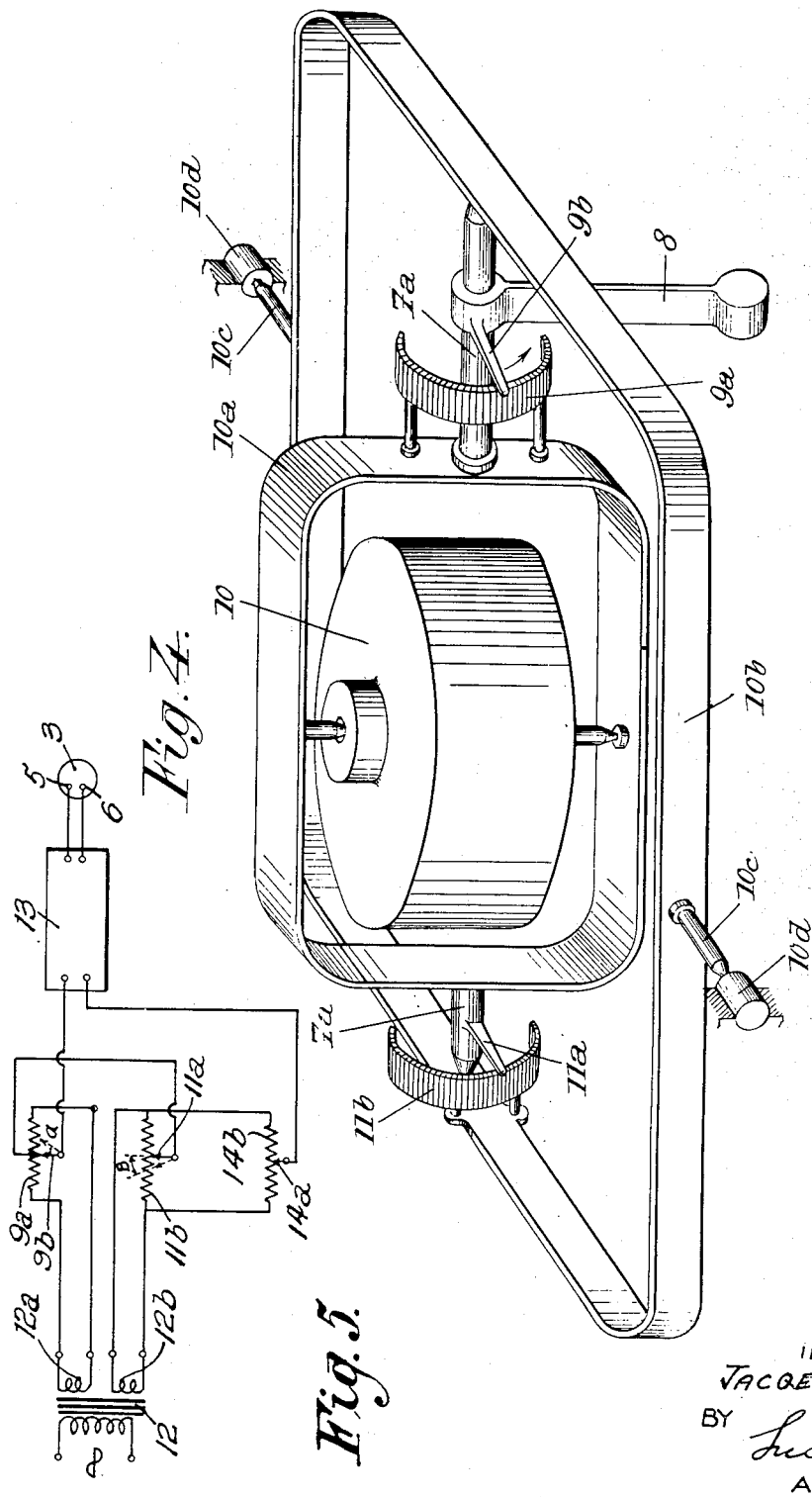

Patented Jan. 8, 1952

2,581,743

UNITED STATES PATENT OFFICE 2,581,743

AUTOMATIC SYSTEM FOR AIRCRAFT

Jacques Zakheim, Paris, France, assignor to Office National d'Etudes et de Recherches Aeronautiques (O. N. E. R. A.), Paris, France, a society of France Application July 9, 1948, Serial No. 37,885
In France December 23, 1947

4 Claims. (Cl. 244—79)

The invention relates to automatic piloting systems for aircrafts.

Its chief object is to provide a system of this kind which is better adapted to meet the requirements of practice than those used up to now, in particular which causes the aircraft to be correctly banked when negotiating a turn under control of means other than the direct action of the pilot.

A preferred embodiment of my invention will be hereinafter described with reference to the accompanying drawings, given merely by way of example and in which:

Fig. 1 is a diagrammatic plan view of an airplane fitted with an automatic piloting system of the kind with which the present invention is concerned;

Fig. 2 is a section on the line II—II of Fig. 1;

Fig. 3 is an electric diagram showing the connections to be provided between the various elements of said piloting system;

Fig. 4 is a perspective view of a portion of an automatic piloting system made according to an embodiment of my invention;

Fig. 5 is an electric wiring diagram corresponding to the piloting system of Fig. 4.

The automatic piloting system according to my invention will be supposed to be applied to an airplane including, among other control surfaces, ailerons 1 of the differential action type mounted on the trailing edge of wing 2.

The piloting system may be of any suitable general construction, including for instance a plurality of telecontrol means for operating the various steering and elevator control surfaces of the airplane. It will be assumed that the telecontrol means for operating ailerons 1 are of the electric type. I will call "aileron line" the particular telecontrol means which include for instance, as diagrammatically shown by Fig. 1, a servo-motor 3 (preferably operable in response to variations in the direction and amplitude of a suitably applied voltage) actuating control means 4 which operate ailerons 1, the terminals 5 and 6 of this servo-motor being connected with a roll correcting device and with a device for controlling transverse accelerations which will be hereinafter more explicitly referred to.

The aileron line (or, to be more accurate, the servo-motor 3 belonging to this line) is operatively connected with a device sensitive to accelerations acting in the transverse direction so that the ailerons are pivoted differentially in the direction corresponding to a turn started by the action of the steering control line and held in active position as long as the airplane has not reached the correct angle of bank (for which its floor is substantially perpendicular to the apparent vertical direction), said ailerons being returned into neutral position as soon as this correct banking is obtained.

The device sensitive to transverse accelerations is a pendular system responsive exclusively to said accelerations and to the acceleration of gravity.

In the construction illustrated by Figs. 1 to 3, this pendular system includes a pendulum 8 rotatable about an axis 7 parallel to the longitudinal axis of the airplane and which automatically indicates, as soon as a turn is started, the apparent vertical direction.

The pendulum 8 operates a device, for instance of the pneumatic or electric type, for translating relative movements of said pendulum into variations in current supplied to servo-motor 3. This device may be constituted by a potentiometer one of the elements of which (for instance resistance 9a) is rigid with the airplane while the other element (for instance sliding contact 9b) is carried by pendulum 8, this potentiometer being adapted to supply servo-motor 3 with an energizing voltage of suitable sign as long as the airplane has not assumed its correct banking position. When this position is reached, the elements 9a, 9b of the potentiometer again occupy the relative positions they had before the turn was started (corresponding to the neutral position of said potentiometer), and ailerons 1 are restored into neutral position until new transverse accelerations are produced, due for instance to the end of the turn, i. e. to the fact that the aircraft is again flying in a straight line.

With the electric arrangement shown by Fig. 3, one of the terminals 6 of servo-motor 3 is connected with movable contact 9b which, in neutral position, is on the middle point of resistance 9a. On the other hand, the middle point of a resistance 9c fed with current in parallel with resistance 9a from a common source of voltage 9d is connected with the other terminal 5 of servo-motor 3.

It should be noted that this solution implies that the action of the potentiometer controlled by pendulum 8 has a preponderating effect as soon as a turn is started and that, in particular, it is not opposed by the action of the roll corrector which, due to its function, tends to prevent the airplane from assuming any lateral inclination.

In order to avoid any detrimental neutralizing of the pendular system action, it is therefore necessary, for instance, either to provide a more powerful potentiometer for the pendular system, or to place the potentiometer of the roll corrector out of action every time the airplane is to start an automatically controlled turn.

However, according to my invention, as illustrated by Figs. 4 and 5, I find it preferable to cause the pendular device to cooperate with the roll corrector in such manner that said roll corrector cooperates in operating ailerons 1 and returning them into neutral position when correct banking has been obtained.

For this purpose, I make use of a gyroscope 10 of vertical axis (which may be the gyroscope of the artificial horizon usually provided on board an aircraft).

The inner gimbal ring 10a of this gyroscope is rigid with a spindle 7a located in a vertical plane parallel to and, for instance, passing through the fore-and-aft axis of the airplane, and this spindle 7a is journalled at its end in the outer gimbal ring 10b of said gyroscope, which ring is pivoted through a transverse spindle 10c, in bearings 10d rigid with the airplane.

One of the characteristics of such an apparatus is that spindle 7a, rigid with the inner ring 10a, is always horizontal, whatever be the position of the airplane.

Taking advantage of this characteristic, I pivot about the axis of spindle 7a a pendulum 8 which carries one of the elements, for instance the sliding contact 9b, of a potentiometer the other element of which, to wit a resistance 9a disposed along a circular arc, is carried by the inner ring 10a of the gyroscope, this potentiometer being connected with servo-motor 3 in a manner which will be more explicitly indicated hereinafter.

Movable contact 9b is fixed on pendulum 8 in such manner that, when said pendulum is subjected only to the action of gravity, that is to say when no transverse acceleration is acting thereon, said movable contact is located on the middle point of resistance 9a, potentiometer 9a, 9b then supplying between its movable contact and the middle point of a reference resistance, no feed voltage for servo-motor 3.

The roll corrector is constituted by a potentiometer 11a—11b the two elements of which are mounted respectively on the spindle 7a and on the outer ring 10b of the gyroscope. For instance spindle 7a carries (preferably near the end thereof opposed to that near which pendulum 8 is mounted) sliding contact 11a which cooperates with a circular resistance 11b carried by outer ring 10b, said movable contact being in such angular position that it is located on the middle point of resistance 11b when the airplane is not banked.

Servo-motor 3, which operates the ailerons, is supplied with current through both of said potentiometers 9a—9b, 11a—11b, connected in such manner that the voltages they tend to supply respectively when the airplane is yawed, and when subsequently it is banked correspondingly, are opposed to each other.

It will be understood that with such an arrangement, as soon as a turn is started, the sliding contact of potentiometer 9a—9b, under the action of pendulum 8, is moved to operate motor 3 so as to rotate the ailerons in the direction which banks the aircraft to correspond to this turn. As the airplane starts rolling to be thus banked, the sliding contact of potentiometer 11a—11b moves gradually away from its neutral position to supply servo-motor 3 with a voltage opposed to the preceding one. When the two opposed voltages have become equal to each other, servo-motor 3 ceases to be energized and ailerons 1 can be restored into neutral position by suitable return means.

A wiring diagram illustrating such an arrangement is shown by Fig. 5.

Alternating current is supplied from a suitable source to a transformer 12 having two secondaries 12a, 12b, respectively connected with the resistances 9a and 11b of the two above mentioned potentiometers. The middle point of resistance 9a is connected with the arm 11a of potentiometer 11a—11b and the arm 9b of potentiometer 9a—9b is connected with the input of an amplifier 13 the output of which is connected with the terminals 5—6 of servo-motor 3.

In this embodiment, the means for automatically tending to restore the ailerons into neutral position include a potentiometer 14a—14b one of the elements of which, for instance resistance 14b, connected in shunt with resistance 11b, is fixed, whereas the other element, in this case sliding contact arm 14a, is movable in response to the displacements of the ailerons, this arm 14a being located on the middle point of resistance 14b when the ailerons are in neutral position. Arm 14a is electrically connected with another terminal of amplifier 13.

Supposing that the parts are mechanically mounted as illustrated by Fig. 4, the electrical connections will be supposed to be such that:

At a given time the polarities at the ends of resistances 9a on the one hand and 11b (and accordingly 14b) on the other hand are similarly positioned;

Rotation of arm 9b in the clockwise direction with respect to resistance 9a will cause motor 3 to run in the direction which displaces the ailerons so that the airplane is rolled in the clockwise direction, and vice-versa; and Rotation of arm 14a in one direction with respect to resistance 14b, caused by movements of the ailerons in one direction, will tend to cause motor 3 to run in the direction which moves said ailerons in the opposed direction so as to restore said arm 14a into neutral position on resistance 14b.

Now, if it is supposed, for instance, that the aircraft is being yawed, for instance in the clockwise direction, pendulum 8 (Fig. 4) is immediately rotated in the clockwise direction, causing arm 9a to turn through an angle a in the clockwise direction. As a consequence, servo-motor 3 is started in the direction which moves the ailerons to roll the aircraft in the clockwise direction (all directions of rotation about the fore-and-aft axis of the aircraft being hereinafter given with the assumption that said aircraft is looked at from the rear).

This operation of the ailerons causes the airplane to roll in the clockwise direction, i. e. toward the correct banked position for a right hand turn. However if this bank producing pendulum 8 were alone to work, the rolling movement would not necessarily stop when the desired banking position is reached. But the roll corrector controlled by potentiometer 11a—11b cooperates therewith to balance its action, and therefore stop it, as soon as the correct angle of banking is reached. This is due to the fact that, as soon as the aircraft starts rolling in the clockwise direction, resistance 11b fixed to said airplane begins to rotate in the clockwise direction, whereas arm 11a, carried by the gyroscope, remains stationary. In other words, arm 11a turns in the anti-clockwise direction with respect to resistance 11b. This action of potentiometer 11a—11b is therefore opposed to that of potentiometer 9a—9b. And while the arm of potentiometer 9a—9b turned practically instantaneously through an angle a in the clockwise direction, the arm of potentiometer 11a—11b turns in the opposite direction gradually as the aircraft is rolling toward the correct banked position. A time comes where the angle β through which arm 11a has turned is equal to the angle a through which the arm of potentiometer 9a—9b had been turned by pendulum 8. Supposing that resistances 9a and 11b are similar to each other, the actions of potentiometers 11a—11b and 9a—9b connected in series, then balance each other and the system is resorted to neutral conditions, as far as the supply of current therethrough to servo-motor 3 is concerned.

But the arm of potentiometer 14a—14b has been rotated by the operations of the ailerons and, as above explained, this potentiometer is inserted in the feed circuit of servo-motor 3 to operate said servo-motor to resore said ailerons to neutral position.

Thus, as long as the aircraft is kept yawing, i. e. is turning, in a uniform manner, it remains banked at an angle corresponding to the conditions of this turn, the ailerons having been returned into neutral position. When the turning movement ceases, pendulum 8 pivots in the anti-clockwise direction and all the operations above described take place, but in opposed directions, respectively, until the airplane is flying in a straight line with both wings at the same level and the ailerons returned to neutral position.

Of course, a turn toward the left would take place in a similar manner, since the arrangement is symmetrical.

It is pointed out that the correcting action of potentiometer 11a—11b, responsive to rolling movements of the aircraft, can always take place if the aircraft is accidentally rolled independently of the actions of the ailerons, and this at any time, both when the aircraft is flying on a straight line or is taking a turn.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In combination, an aircraft having lateral control surfaces for rolling said aircraft, a gyroscope mounted on said aircraft about a vertical axis, gimbal means for connecting said gyroscope with said aircraft including an outer ring pivoted to said aircraft about a transverse axis, a vertical inner ring for pivotally supporting said gyroscope and a horizontal spindle parallel to the fore-and-aft direction of said aircraft for pivotally interconnecting said two rings, a bank controlling device including two cooperating elements, one rigid with said inner ring and the other constituted by a gravity pendulum pivoted to said spindle about the horizontal axis thereof, and servo-motor means responsive to relative displacements of said elements for operating said lateral control surfaces to bank said aircraft, a roll correcting device including two cooperating elements, one rigid with said outer ring and the other with said spindle, and servo-motor means responsive to relative displacements of said two last mentioned elements for operating said lateral control surfaces to oppose rolling of said aircraft, the lateral control surface operating means of said roll correcting device and said bank controlling device respectively being arranged to exert equal and opposed actions on said control surfaces when the banking angle is equal to the angle made by the apparent vertical of the aircraft with the true vertical, and means responsive to displacements of said lateral control surfaces from their neutral position for operating the whole of said servo-motor means so as automatically to return said control surfaces to said neutral position when the opposed respective actions of said bank controlling device and said roll controlling device are equal and balance each other.

2. In combination, an aircraft having lateral control surfaces for rolling said aircraft, a servo-motor for actuating said control surfaces, a gyroscope mounted on said aircraft about a vertical axis, gimbal means for connecting said gyroscope with said aircraft including an outer ring pivoted to said aircraft about a transverse axis, a vertical inner ring for pivotally supporting said gyroscope and a horizontal spindle parallel to the fore-and-aft direction of said aircraft for pivotally interconnecting said two rings, a bank controlling device including two cooperating elements, one rigid with said inner ring and the other constituted by a gravity pendulum pivoted to said spindle about the horizontal axis thereof, and means responsive to relative displacements of said elements for operating said servo-motor to actuate said lateral control surfaces to bank said aircraft, a roll correcting device including two cooperating elements, one rigid with said outer ring and the other with said spindle, and means responsive to relative displacements of said two last mentioned elements for operating said servo-motor to actuate said lateral control surfaces to oppose rolling of said aircraft, the motor operating means of said roll correcting device and said bank controlling device respectively being arranged to exert equal and opposed actions on said servo-motor when the banking angle is equal to the angle made by the apparent vertical of the aircraft with the true vertical, and means responsive to displacements of said lateral control surfaces from their neutral position for operating said servo-motor so as automatically to return said control surfaces to said neutral position when the opposed respective actions of said bank controlling device and said roll controlling device on said servo-motor are equal and balance each other.

3. In combination, an aircraft having lateral control surfaces for rolling said aircraft, a gyroscope, a bearing frame for said gyroscope, a part pivotally mounted with respect to said frame about a horizontal axis parallel to the fore-and-aft plane of symmetry of said aircraft and pivoted to said aircraft about an axis at right angles to said plane of symmetry, a bank controlling device including two cooperating elements, one rigid with said frame and the other constituted by a gravity pendulum pivoted to said frame about said horizontal axis, and servo-motor means responsive to relative displacements of said elements for operating said lateral control surfaces to bank said aircraft, a roll correcting device including two cooperating elements, one rigid with said frame and the other with said part, and servo-motor means responsive to relative displacements of said two last mentioned elements for operating said lateral control surfaces to oppose rolling of said aircraft, the lateral control surface operating means of said roll correcting device and said bank controlling device respectively being arranged to exert equal and opposed actions on said control surfaces when the banking angle of the aircraft is equal to the angle made by the apparent vertical of the aircraft with the true vertical, and means responsive to displacements of said lateral control surfaces from their neutral position for operating the whole of said servo-motor means so as automatically to return said control surfaces to said neutral position when the opposed respective actions of said bank controlling device and said roll correcting device are equal and balance each other.

4. In combination, an aircraft having lateral control surfaces for rolling said aircraft, a servo-motor for actuating said control surfaces, a gyroscope, a bearing frame for said gyroscope, a part pivotally mounted with respect to said frame about a horizontal axis parallel to the fore-and-aft plane of symmetry of said aircraft and pivoted to said aircraft about an axis at right angles to said plane of symmetry, a bank controlling device including two cooperating elements, one rigid with said frame and the other constituted by a gravity pendulum pivoted to said frame about said horizontal axis, and means responsive to relative displacements of said elements for operating said servo-motor to actuate said control surfaces to bank the aircraft, a roll correcting device including two cooperating elements, one rigid with said frame and the other with said part, and means responsive to relative displacements of said two last mentioned elements for operating said servo-motor to actuate said lateral control surfaces to oppose rolling of said aircraft, the motor operating means of said roll correcting device and said bank controlling device respectively being arranged to exert equal and opposed actions on said servi-motor when the banking angle of the aircraft is equal to the angle made by the apparent vertical of of the aircraft with the true vertical, and means responsive to displacements of said lateral control surfaces from their neutral position for operating said servo-motor so as automatically to return said control surfaces to said neutral position when the opposed respective actions of said bank controlling device and said roll controlling device on said servo-motor are equal and balance each other.

JACQUES ZAKHEIM.

REFERENCES CITED

The following references are of record in the file of this patent:

UNITED STATES PATENTS

| Number | Name | Date |
|---|---|---|
| 2,099,808 | Havill | Nov. 23, 1937 |
| 2,162,862 | Protzen | June 20, 1939 |
| 2,450,907 | Newton et al. | Oct. 12, 1948 |